Feb. 23, 1937. G. E. MIRFIELD 2,071,760
MACHINE FOR WELDING TUBULAR ARTICLES
Original Filed July 18, 1933 3 Sheets—Sheet 3
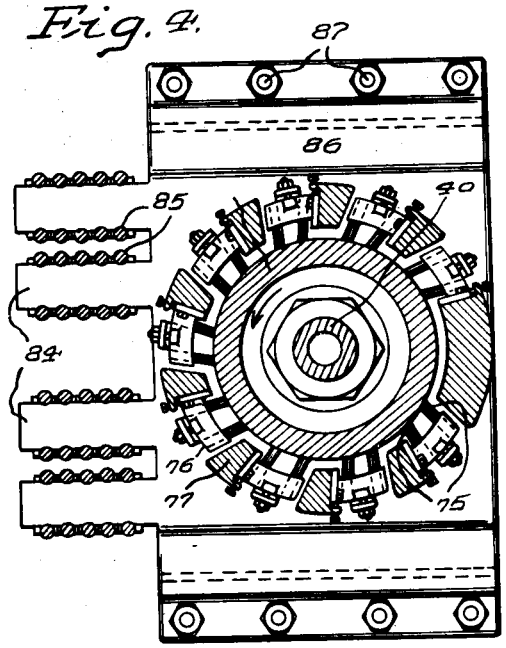
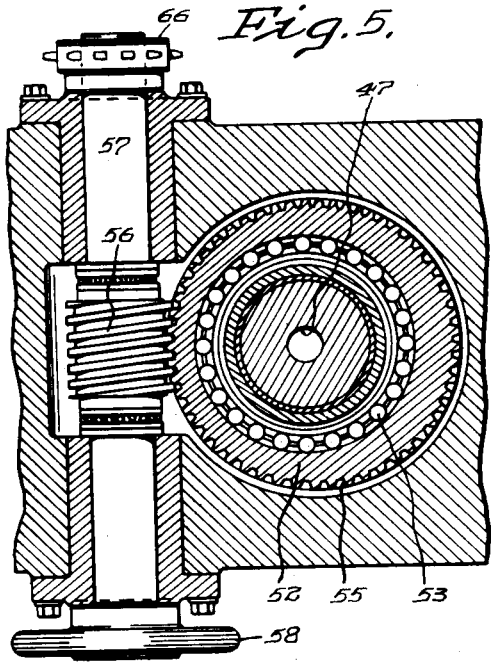
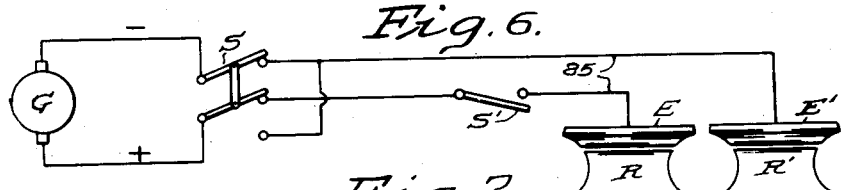
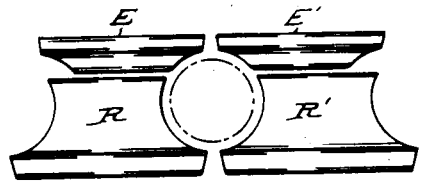
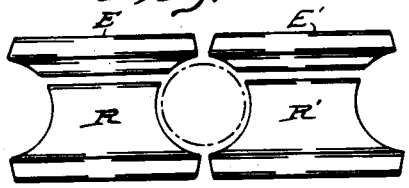
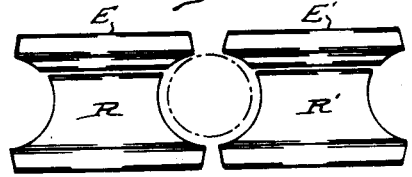
INVENTOR.
George E. Mirfield
BY
ATTORNEY Patented Feb. 23, 1937

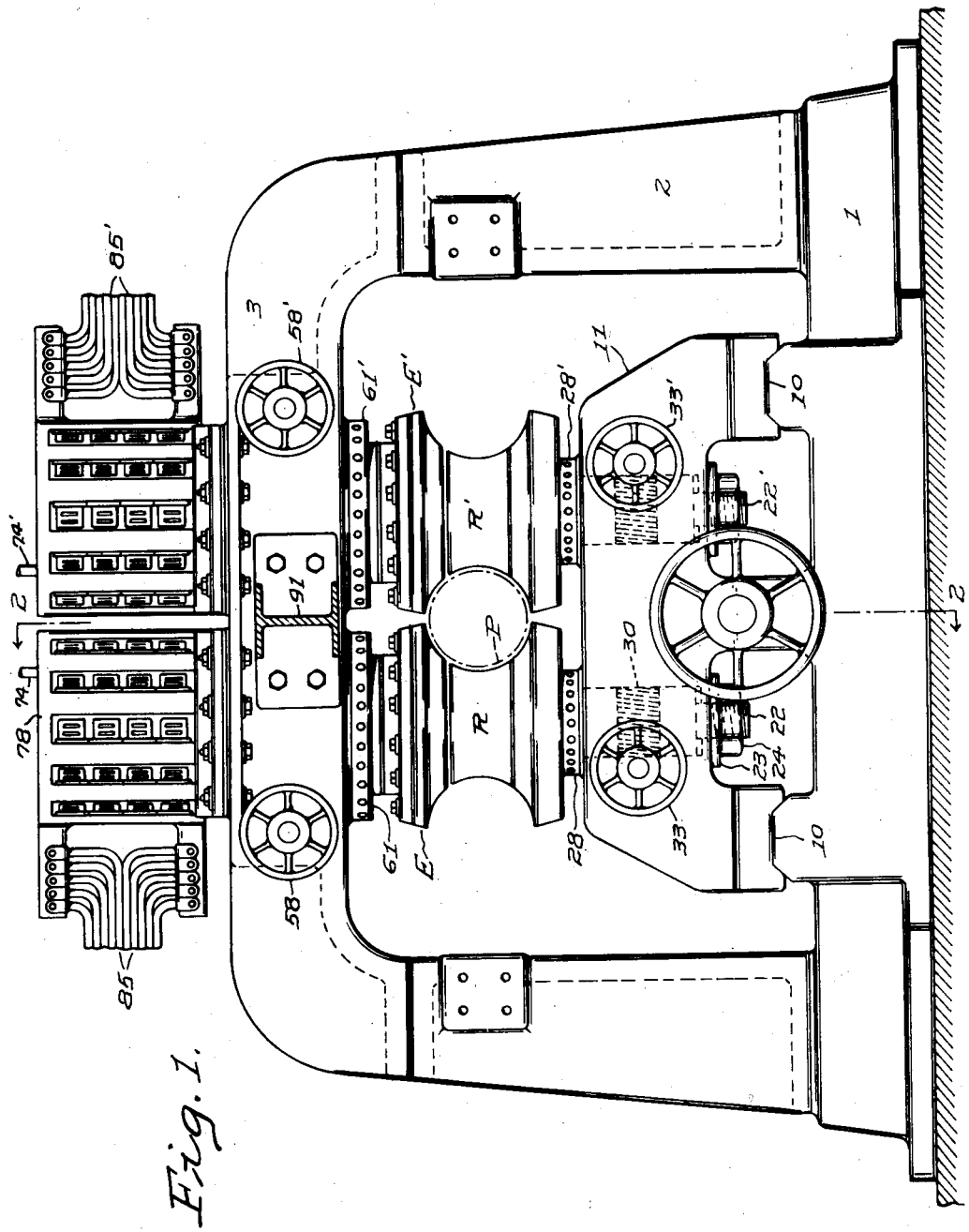

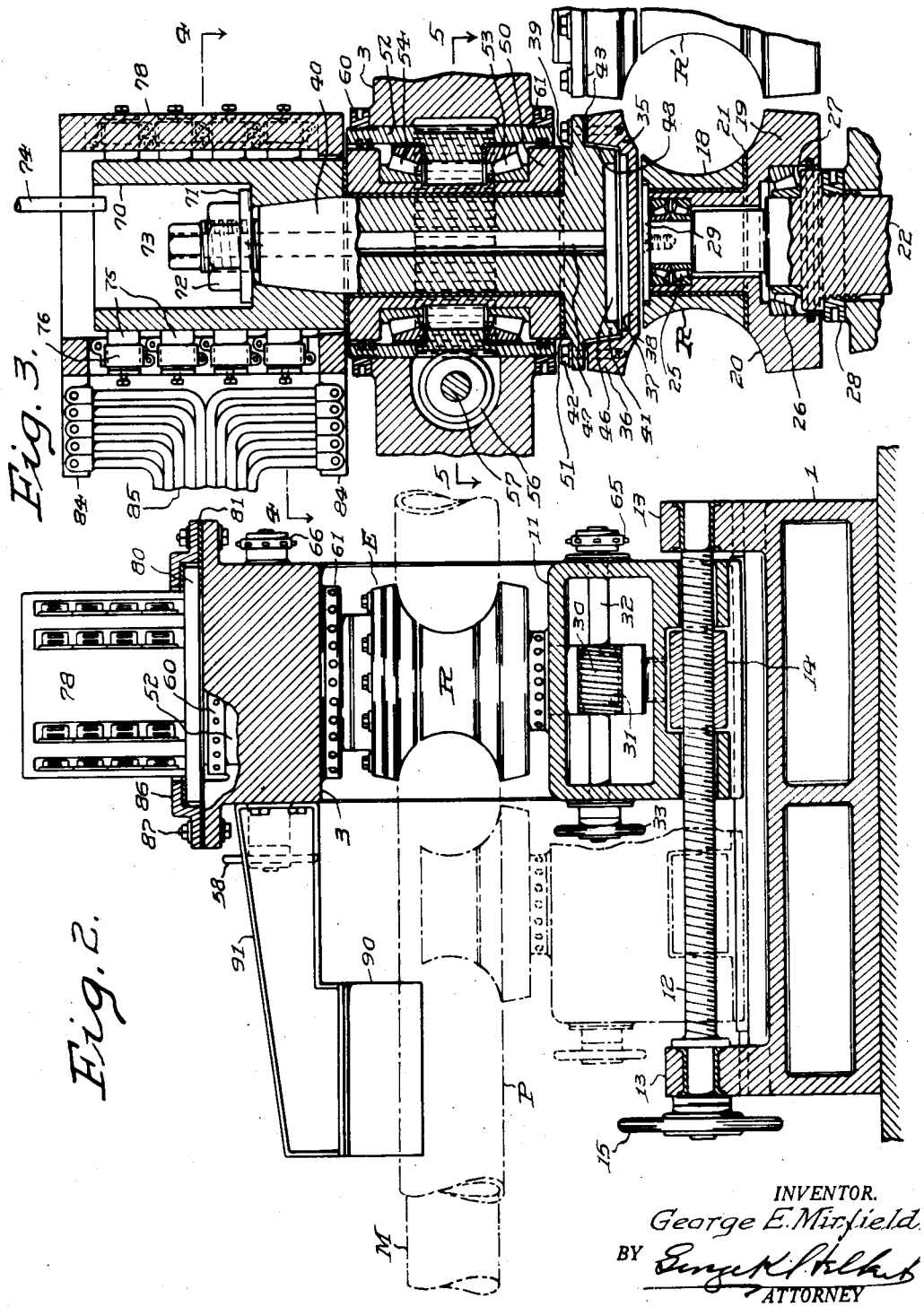

2,071,760

UNITED STATES PATENT OFFICE 2,071,760

MACHINE FOR WELDING TUBULAR ARTICLES

George E. Mirfield, Youngstown, Ohio, assignor, by mesne assignments, to Direct Current Welding Company, a corporation of Delaware Original application July 18, 1933, Serial No. 680,932, now Patent No. 2,037,916, dated April 21, 1936. Divided and this application August 24, 1935, Serial No. 37,712. Renewed December 18, 1936

5 Claims. (Cl. 219—6)

This application is a division of my copending application, Serial No. 680,932, filed July 18, 1933 (now Patent No. 2,037,916, dated April 21, 1936).

The principal object of the present invention is the provision of an improved machine through the medium of which the longitudinal seam produced when a flat blank is formed up into a tube of substantially cylindrical cross section, as in the manufacture of welded pipes, tubes and other similar articles, can be welded as the tube is fed progressively through the machine. Many different machines have heretofore been proposed and utilized for a similar purpose with varying degrees of success; the machine of my invention, however, embodies certain features, characteristics and combinations of instrumentalities, as will hereinafter more fully appear, which render it eminently suitable for its intended purpose and facilitate the rapid and efficient production of satisfactory welds at a minimum cost and the adaptation of the machine to welding different sizes of pipe or other tubular articles.

To this end the machine includes, among other things, a pair of pressure rolls which serve as the unwelded pipe is projected between them to bring the juxtaposed edges of the seam into proper relation for welding, a pair of rotatable electrodes respectively adjacent the pressure rolls and means operable to selectively adjust the relation of these several parts to the pipe and to facilitate changing the electrodes and/or rolls to adapt the machine for welding pipe of different diameters or their replacement should they become worn or damaged.

The machine also embodies means for effectivly cooling the electrodes and associated parts subjected to the intense heat adjacent the welding point and means for conducting the welding current to and from the electrodes with maximum of efficiency and minimum of loss and so designed as to enable the use of ordinary commercial brushes for carrying the current to and from the collector ring associated with each electrode.

Moreover, while for usual conditions of installation the machine is constructed and arranged so that the current conveying mechanism and electrodes are located above the pressure rolls, it may also be arranged in such manner that these parts are disposed below them, in which case many of the current carrying elements can be disposed beneath the floor on which the machine is located and thus remote from persons concerned with its operation, with consequent lessening of danger from shock and, frequently, making a neat and otherwise desirable installation.

Other objects of the invention as well as novel features, improvements, advantages and arrangements of instrumentalities comprehended thereby are hereafter more fully pointed out or will be apparent from the following description of one form of machine constructed in accordance therewith and illustrated in the accompanying drawings forming part hereof.

The machine to which I shall herein specifically refer is adapted for welding pipe and/or other tubular articles by means of direct current which may be desirably delivered at the machine at a suitable pressure and volume, for example, a voltage approaching 10 and an amperage approximating 150,000 when welding a pipe of half-inch wall thickness; however, the voltage and/or amperage is susceptible of material variation from the example given in accordance with the particular operating conditions encountered and/or the character of the work being welded. It will be apparent to those skilled in the art, however, that by suitable modification the machine may be adapted to use with alternating current without departing from the basic principles of the invention as hereinafter explained, although under most operating conditions when direct current of the character required for satisfactory welding is available, it will usually be preferred, for the reason, among others, that a complete and continuous weld throughout the entire length of the welded seam can thereby be produced in contradistinction to the alternate welded and non-welded areas characteristic of seam welds made by alternating current and frequently referred to as the "stitch" or "recurrent" seam weld.

In the drawings, Fig. 1 is a front elevation of the machine as it appears when viewed from the direction in which the unwelded pipe passes through it;

Fig. 2 is a vertical section substantially on line 2—2 in Fig. 1;

Fig. 3 is an enlarged fragmentary central vertical section through one of the electrodes and adjacent parts;

Fig. 4 is a horizontal section on the plane of line 4—4 in Fig. 3;

Fig. 5 is a fragmentary horizontal section on the plane of line 5—5 in Fig. 3;

Fig. 6 is a diagrammatic view showing the preferred arrangement of the leads and switches between the generator or other source of power and the electrodes, and Figs. 7, 8, and 9 are respectively diagrammatic views showing different arrangements of electrodes and pressure rolls which may be effected by suitable adjustment as hereinafter described.

Throughout the drawings like characters of reference designate the same parts in related figures.

As shown, the machine comprises a base 1 from opposite sides of which rise pedestals 2, 2 bridged by a transversely extending beam generally designated as 3 which serves to support the electrodes and other parts as hereinafter described.

Between the pedestals 2, 2 the base is provided with laterally spaced ways 10 upon which the pressure roll supporting frame 11 which bridges the space between the ways is longitudinally slidable. For effecting longitudinal movement of this frame there is provided a screw 12 journaled in upstanding lugs 13 on base 1 and cooperative with a nut 14 housed in the frame, rotation of the screw being effected by means of a hand wheel 15 secured to one of its ends. Thus, by turning the screw in either direction, the frame 11 can be moved along the ways to any desired position of adjustment thereon between the limits determined by the lugs 13, 13; in Fig. 2, the frame is shown in full lines in operative position, that is, one in which the pressure rolls which it carries are in substantial vertical alignment with the electrodes disposed above them, and is also shown in dot and dash lines substantially at the limit of its path of movement toward the front of the machine and thus in the position to which it is preferably brought when the electrodes and/or pressure rolls are being changed.

Two pressure rolls, R, R' are provided and arranged for rotation on vertical axes on opposite sides of the center line of the machine; as they are identical and are supported and adjusted by similar means, description of one of them, for example, roll R and its associated mechanism will suffice for the other, the corresponding parts of which are designated by the same numerals with the addition of a prime (').

As best shown in Fig. 3, the roll is desirably made in two parts relatively rotatable with respect to each other. The upper roll part is in the form of a sleeve 18 having its outer surface curved symmetrically from top to bottom on an arc the center of which coincides with the horizontal plane midway between the top and bottom of the sleeve, while the ends of the latter terminate in horizontal planes. This sleeve is rotatably seated on a cylindrical extension of the major or bottom part 19 of the roll, the outer part of the upper face of which may be curved as at 20 in prolongation of the arcuate surface of the sleeve, the radius of the combined arc thus formed when the two parts of the roll are assembled being of course primarily determined by the diameter of the pipe which is to be welded so that the curvature of the said arc will conform more or less closely to its outer surface. A thin flanged bushing 21 of bronze or other suitable bearing metal may be interposed between the two parts of the roll to decrease friction during their relative rotation.

The lower part 19 of the roll is mounted on a pin 22 extending downwardly through the supporting frame 11, the body of the pin being preferably of larger diameter than its lower end, which is threaded on its extremity, and the frame is suitably bored and counterbored so the pin will form a snug rotative fit therein. On the lower threaded end of the pin below the frame are disposed a washer 23 and nut 24 which, in cooperation with the adjusting collar hereinafter described restrain the pin from axial movement when they are screwed up against the lower face of the frame. At its upper end the pin is formed to receive a pair of vertically spaced anti-friction bearings 25, 26 respectively interposed between it and the lower part of the roll and is also provided with a peripheral flange 27 forming a seat for the lowermost anti-friction bearing and overlying an adjusting collar 28 interposed about the body of the pin between the flange and frame 11. Adjacent this collar the pin is externally threaded and the collar correspondingly internally threaded for cooperation therewith; thus, by loosening nut 24 and turning the collar, which is desirably provided with spanner holes for the reception of a wrench, the pin can be raised and lowered for a limited distance to correspondingly move the roll relatively to the frame 11. The upper part 18 of the roll is maintained in assembled relation with the pin and lower part by a keeper plate 29 disposed in a countersink in the upper face of part 18, a screw extending through the plate into the pin serving to hold the former in place.

Consequently, when the frame 11 is retracted to the dot and dash line position shown in Fig. 2 by suitable manipulation of screw 12, both parts of the roll can be readily removed from the pin by taking off the plate 29 and others of different size and/or contours substituted therefor, while whenever required the vertically adjusted height of the roll with respect to the other portions of the machine can be varied by suitable manipulation of the collar 28 after nut 24 has been backed off.

As best shown in Fig. 3, that portion of pin 22 lying above flange 27 is eccentrically disposed with respect to the body of the pin which extends into the supporting frame, with the result that rotation of the pin through the medium of suitable mechanism is effective to move the pressure roll horizontally in a generally in or out direction with respect to the path of pipe P. This mechanism comprises a series of teeth 30 cut in the periphery of the body of the pin and a worm 31 mounted on a shaft 32 journaled in frame 11 and carrying a hand wheel 33 to facilitate its rotation. Thus, by turning the shaft, the worm can be operated to revolve pin 22 in either direction to move the pressure roll in or out from the path of the pipe, the limit of adjustment in this respect being of course determined by the amount the upper end of the pin is eccentrically offset from the axis of the pin body.

It will therefore now be apparent that when the pressure rolls R, R' are adjusted by their respective adjusting mechanisms so as to lie equidistant from the center line of the machine, as shown in Fig. 1, they define the major portion of the pass through which the pipe P travels during the welding operation and are free to rotate through frictional engagement with the pipe. The parts of each roll are also free to rotate relatively to each other, an arrangement which tends to lessen the wear on the roll as a whole and will thus generally be preferred, though obviously rolls made in one part instead of two may be utilized. It will be further apparent that by adjusting the rolls in or out through the medium of the hand wheels 33, 33', the pressure exerted on the pipe may be varied while the point at which that pressure is applied with reference to the welding point is determined by the position of longitudinal adjustment of the roll carrying frame 11 and it therefore results that with a given set of rolls designed for a pipe of given diameter, the exact degree of compression exerted inwardly on the pipe wall, as well as the point at which it is applied as the pipe moves through the machine, can be determined to a nicety by suitable adjustment of the rolls and roll frame through the medium of the various mechanisms provided for that purpose.

Located in a plane above the rolls are the electrodes, generally designated as E, E' which are identical in construction, respectively carried by beam 3 and adapted for rotation by their frictional engagement with the pipe as it passes through the machine. Each electrode is arranged for adjustment in and out of the path of the pipe and also for limited vertical adjustment in a manner generally similar to the pressure rolls, and as the mechanism provided for effecting these adjustments is substantially the same for both electrodes, a description of one of the latter, for example, electrode E and its associated mechanism, will apply equally to the other, the corresponding parts of which are designated by the same numerals with the addition of a prime (').

As best shown in Fig. 3, that part of the electrode designed to contact the pipe is a circular pan-shaped member 35, having an annular rim 36 and a flat bottom 37, whose operative face 38 is preferably curved to substantially conform to the pipe with which it is designed to be used and may thus follow an arc of the same radius as the surface of the pressure roll above which it is disposed; this member, which is preferably made of copper, is removably supported on a hub 39 to which the member is removably attached, the hub being integral with the lower end of a spindle 40 extending upwardly therefrom. To this end the hub may be provided with a peripheral flange overlying the upper face of the rim 36 and a conical rim 41 depending below the flange with which the inner face of the rim 36 conforms, so that when bolts 42, circumferentially spaced about the flange and extending into the rim, are set up the pan-shaped member is held snugly and rigidly on the hub, the parts being so proportioned that a clearance 43 is left between the upper face of the rim and adjacent surface of the hub flange. Above the bottom 37 of the pan-shaped member the hub may be hollowed out somewhat to provide an annular chamber 46 for a purpose to be hereinafter described, while a series of circumferentially spaced grooves 48 are provided in the outer face of the hub rim 41 leading from the chamber 46 to clearance 43.

The spindle 40 is provided with a preferably axial bore 47 communicating with chamber 46, and extends upwardly through a sleeve 50 from which it is insulated by an insulating bushing 51 having flanges at its upper and lower ends. The sleeve is in turn enclosed in an adjusting sleeve 52, anti-friction bearings 53, 54 being interposed between the two sleeves and suitably insulated from the adjusting sleeve. The latter has teeth 55 on its periphery cooperative with a worm 56 on a shaft 57 carrying a hand wheel 58 by means of which the adjusting sleeve can be turned about the axis of its outer periphery, and as sleeve 50 is eccentrically disposed in the adjusting sleeve, this movement of the latter is effective to move the electrodes and attached parts in or out laterally with respect to the path of the pipe.

The adjusting sleeve is threaded on its extremities and held in vertically adjusted position with respect to beam 3 by internally threaded collars 60, 61 disposed above and below the beam so that by screwing up on one collar while unscrewing the other, vertical adjustment of the electrodes can be effected with respect to the path of the pipe.

It will now be apparent that either pressure roll can be adjusted in or out from the path of the pipe by means of hand wheel 33 associated with it and in a corresponding way that either electrode may be similarly adjusted by means of its hand wheel 58. In lieu of this arrangement, a sprocket 65 may be mounted on each shaft 32 and the two sprockets interconnected by a chain (not shown) so that turning either hand wheel 33 will operate both shafts and consequently effect the in or out adjustment of both pressure rolls simultaneously while in a like way, sprockets 66 may be fitted on shafts 57 and interconnected by a chain to enable the electrodes to be adjusted in or out simultaneously.

For conveying current to or from the electrodes, as the case may be, a collector ring 70 is seated on the upper end of the spindle and held in position by a washer 71 and nut 72 the extremity of the spindle shaft being preferably squared or made hexagon above the nut. This ring is hollowed out above the spindle to provide a chamber 73 adapted to constantly receive water while the machine is in operation from a connection 74 extending thereinto; from the chamber the water can pass down through passage 47 into chamber 46 in the electrode, thence through grooves 48 and clearance 43 and finally over the subjacent pressure roll and associated parts. The collector ring and the electrode as a whole are thus directly and continuously cooled while, additionally, the pressure rolls and subjacent parts of the machine are subjected to a flow of water which assists in maintaining them at a suitable temperature, although as they are more remote from the welding point they do not require so much cooling as the electrode. Thus, the thorough, continuous and adequate cooling of the pan-shaped member 35 and adjacent parts requisite for maintaining them in operative condition for a reasonable period during the welding operations is effected in a very satisfactory, convenient and efficient way.

Engaging the outer surface of the collector ring are a series of brushes 75 adjustably secured in brush holders 76 arranged in vertically spaced relation about the annularly spaced bars 77 of a cage 78 disposed about the collector ring, the holders being preferably of such construction as to permit the use of commercial brushes such as are readily obtainable in the open market since these are usually considerably cheaper than especially designed ones and their use therefore not only tends to lower the initial cost but also the upkeep expense of the machine. As best shown in Figs. 2 and 4, the bottom of the cage has an outwardly directed flange 80 which rests on a pad 81 of insulating material on the top of beam 3, while from the cage a plurality of arms 84 extend laterally outward; to these arms are connected a series of leads 85 through which current is conveyed to and from the machine. The base of the cage is maintained in operatively fixed relation to beam 3 by transversely extending gibs 86 extending over and insulated from the flange, the gibs being detachably held in place by bolts 87. It will be noted, particularly from Fig. 4, that the bar of the cage lying most nearly adjacent the center line of the machine is made wider than the other bars and that no brushes are provided adjacent this point due to difficulty in suitably adjusting them because of the proximity of the other and opposite cage.

The current flowing to the machine through leads 85, which are preferably slightly flexible, thus passes into the cage and to the brushes from which it is transferred to the collector ring which of course rotates unitarily with spindle 40. Thence it passes down the spindle to the electrode and through the pipe, heating the latter in the vicinity of the welding point by the well known resistance method, and thence through the other electrode, spindle, brushes and ring to the other leads 85'.

As it is desirable to maintain the brush holding cage concentric with the collector ring at all times, it is usually necessary to loosen bolts 87 when adjusting the electrodes in and out from the pipe pass so as to allow the cage to "float" with the collector ring and to set them up again after the adjustment is completed; consequently, to permit the movement of the cage under these conditions some flexibility is desirable in leads 85 as will be readily appreciated.

It will of course be understood that in the operation of the machine, the formed-up but unwelded pipe is fed progressively through it by any suitable means (not shown) and that if desired, internal support can be given to it through the medium of a proper mandrel M a portion of which is indicated in dot and dash lines in Fig. 2. For guiding the pipe and holding it in correct position with respect to the electrodes, it is usual to provide a fin 90 adapted to extend into the cleft in the pipe in advance of the pressure rolls, and to support the fin in any convenient way as, for example, by an overhanging bracket 91 bolted to the front of beam 3 and insulated therefrom, the bracket being preferably so positioned as not to interfere with the retraction of the pressure rolls when the latter are to be changed or otherwise manipulated.

In Fig. 6 I have diagrammatically shown a preferred manner of connecting the machine with a generator G or other source of current. It will be noted that between the generator and leads 85 there is interposed a double-pole switch S by means of which the polarity of the current to the electrodes can readily be reversed by merely throwing the switch from one position to the other as well as another switch S' by which the current can be broken whenever desired. As shown, switch S is so set that the current is directed into electrode E and returned from electrode E' but by merely throwing the switch to its other position, the current will pass to electrode E' and return from electrode E.

It will now be apparent that in a machine constructed in accordance with my invention it is extremely easy not only to adjust the position of the pressure rolls and/or electrodes so as to apply varying degrees of pressure to the pipe or vary the point of maximum pressure application with respect to the welding point or the degree of contact of the electrodes with the pipe, which of course are continuously rotated by their frictional engagement with the pipe as it passes through the machine, but also to vary the shape of the pass itself to some extent and, further, that by changing the rolls and/or the pan-shaped elements 35 this variation can be accentuated. As illustrative of some of the kinds of pass which can be thus readily formed, Fig. 6 shows each roll and its adjacent electrode concentrically disposed so as to provide the usual substantially circular pass; Fig. 7 shows a generally similar pass formed by using electrodes of relatively smaller diameter and moving the axes of the latter oppositely inward with respect to the axes of the pressure rolls; Fig. 8 shows the electrodes, which are similar to those of Fig. 6, raised and the rolls moved inwardly to provide a substantially elliptical pass with its major axis extending vertically, and Fig. 9 shows the electrodes lowered and the rolls moved out to provide a substantially "oblong" pass the major axis of which extends horizontally. To aid in readily distinguishing the variations in the shape of the passes illustrated in these three figures, a circle has been drawn in dot and dash lines in each of them with its center coincident with the center of the pass, the diameter of the circle being purely arbitrary. These figures are merely typical of numerous adjustments which can be made in accordance with the particular work which is to be welded or the preference of the operator of the machine whereby more or less pressure can be exerted on the pipe by the pressure rolls and/or electrodes, the zone of contact of the latter with the pipe increased or decreased, or the relation altered between the points at which the electrodes and the pressure rolls contact the pipe with a view to obtaining the most satisfactory welding practice in accordance with the operative conditions encountered. In practice under usual welding conditions, particularly good results are attainable when the rolls and electrodes are adjusted in the manner indicated in Fig. 8, that is, so as to form a substantially elliptical pass as such a pass affords an exceptionally good contact between the electrodes and the pipe. I believe I am the first to have recognized this fact and to have made practical use thereof in the pipe welding industry.

In the machine to which I have referred as illustrative of my invention, the brushes are arranged about the collector rings and bear on the outer surface thereof, but under certain conditions it may be preferred to arrange them inside the rings so they will bear on their inner surface and such an arrangement is within the scope and purview of my invention. However, when so arranged, adjustment of the brushes is usually more difficult and for that reason, among others, it is usually more desirable to place them outside the collector rings in the manner hereinbefore described.

From the foregoing description it will be appreciated I have provided a welding machine which is eminently adapted for its intended purpose; in which the pressure rolls and/or electrodes can be adjusted with relation to the pipe with maximum facility and rapidity so as to bring about the most satisfactory welding conditions; in which the electrodes are thoroughly and adequately cooled at all times; in which the electrical losses are small and the electrical efficiency high, and which embodies many other improvements and advantages conjointly contributing to its ability to produce properly welded pipe rapidly, efficiently and at a minimum labor and upkeep cost.

While I have herein referred with considerable detail to one type of machine constructed in accordance with the invention, I do not thereby desire or intend to specifically limit or confine myself to any precise details of design, construction and/or arrangement of the various elements and instrumentalities embodied therein as they are capable of modification and variation in numerous particulars without departing from the spirit and scope of the invention as defined in the appended claims.

Having thus described my invention, I claim and desire to protect by Letters Patent of the United States:

1. In a pipe welding machine, an annular electrode, a spindle extending upwardly therefrom, means supporting the spindle for rotation, a collector ring carried by the upper end of the spindle, a brush holder surrounding and operatively fixed with respect to the ring but laterally therewith, current conveying means connected with said holder, brushes extending from the holder to the collector ring to form a path for the welding current between the holder and the ring and means carried by the spindle supporting means operable to effect lateral movement of the spindle, ring and holder.

2. In a welding machine, an annular electrode providing an internal chamber having an outlet and a contact face adapted to engage the pipe to be welded, a spindle extending upwardly from the electrode provided with a passage communicating with said chamber, means for rotatably supporting the spindle, a collector ring carried by the upper end of the spindle providing a chamber communicating with said passage adapted to receive a cooling fluid, a brush holder supported about the ring, current conveying means connected with said holder, and a series of brushes carried by the holder and engaging the ring to form a path for the welding current between the conveying means and the ring, said ring, chamber, passage, electrode chamber and outlet providing a continuous path for gravity flow of cooling fluid introduced into said ring chamber to thereby successively cool the ring, spindle and electrode.

3. In a pipe welding machine, an electrode, means for supporting the electrode for rotation about a vertical axis comprising a spindle, an adjusting sleeve having a substantially cylindrical eccentric bore surrounding the spindle, means for rotating the sleeve relatively to the spindle to thereby effect planetary movement of the spindle axis about the sleeve axis, a collector ring carried by the spindle and rotatable therewith, a brush holder surrounding the ring, means for supporting the brush holder in substantially coaxial relation with the ring, and brushes extending from the holder to the ring forming a path for welding current therebetween.

4. In a pipe welding machine, an annular electrode, means for supporting the electrode for axial rotation comprising a spindle, a rotatable sleeve having a bearing-receiving aperture eccentrically disposed with respect to its outer surface, an annular bearing in the aperture and surrounding the spindle, means for rotating the sleeve independently of the spindle to thereby effect planetary movement of the spindle axis about the axis of said outer surface, a collector ring carried by the spindle, and brushes engaging the collector ring to form a path for welding current to the spindle and electrode.

5. In a pipe welding machine, a rotatable sleeve having a substantially cylindrical outer surface and an internal bearing-supporting aperture eccentrically disposed with respect thereto, means for rotating the sleeve about the axis of its outer surface, a spindle extending through and supported by the sleeve for rotation about the axis of said aperture, an annular electrode carried by the spindle at its lower end adapted to engage a pipe to be welded, current conveying means, and means interposed between the current conveying means and the spindle forming a path for the welding current to the spindle.

GEORGE E. MIRFIELD.